(No Model.)
H. MILLER.
SHEET METAL CAN.
No. 377,495. Patented Feb. 7, 1888.
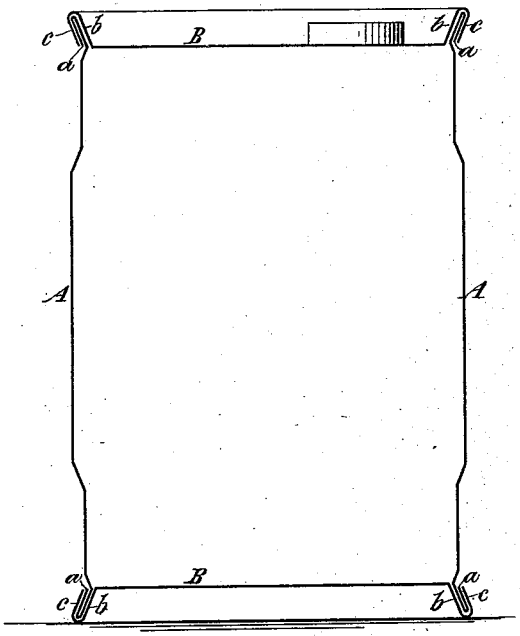
*Fig: 1.*
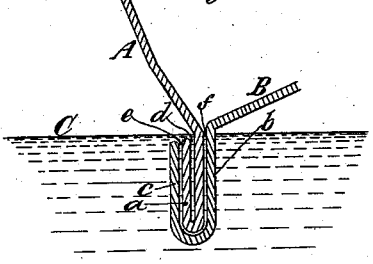
*Fig: 2.*
Witnesses
Joseph W. Roe.
O. Sundgren.
Inventor
Herman Miller.
by attorneys
Brown & Hall.
N. PETERS, Photo-Lithographer, Washington, D. C.

UNITED STATES PATENT OFFICE.

HERMAN MILLER, OF NEW YORK, N. Y.

SHEET-METAL CAN.

SPECIFICATION forming part of Letters Patent No. 377,495, dated February 7, 1888.

Application filed December 10, 1887. Serial No. 257,507. (No model.)

*To all whom it may concern:*

Be it known that I, HERMAN MILLER, a citizen of the United States, residing in the city and county of New York, in the State of New York, have invented a new and useful Improvement in Sheet-Metal Cans and other Vessels, of which the following is a specification, reference being had to the accompanying drawings.

This invention is more especially intended for cans for holding and transportation of refined petroleum; and its object is to provide a joint which in the process of soldering by dipping into molten solder will not fail to receive the solder between all the contiguous surfaces of those parts of the sheet metal of which the joint is formed.

The invention consists in the novel construction of the joint hereinafter described and claimed, whereby the desired result is obtained.

Figure 1 in the drawings is a vertical sectional view of a can having the joints between its sides and bottom constructed according to my invention. Fig. 2 is a vertical section, on a greatly enlarged scale, of those parts of one of the side plates and one of the heads of a can which form the joint, illustrating the act of dipping the joint in molten solder.

Similar letters of reference designate corresponding parts in both figures.

A designates the side plates of the can, and B the heads thereof. The side plates, A, have their upper and lower marginal portions which unite with the heads B doubled by being folded outward, as shown at $a$. The heads have their marginal portions turned outward, as shown at $b$, and folded backward, as shown at $c$, the edge of the part $c$ being presented at the outside of the joint, the space within the outwardly turned and folded parts $b\ c$ being wide enough to receive within it the folded marginal part of A. The plates being thus folded, and the folded marginal portion of the plate A being placed within the folded marginal portion of the plate B, the parts may be soldered by dipping into molten solder in the manner commonly practiced in the soldering of joints of sheet-metal cans for petroleum, as illustrated in Fig. 2, wherein the molten solder is designated by C. The joint thus constructed is better adapted for the reception of the solder into all the interstices of its folds when dipped into the molten solder than any of the joints heretofore used or known to the trade. When dipped so that the outer edges of the parts $a\ c$ are submerged, two openings, $d\ e$, Fig. 2, are presented for the entrance of the solder into the joint, the opening $d$ leading to the interior of the fold $a$, and the opening $e$ to the space between $a$ and $c$, and from the latter space the solder flows freely past the bend at the bottom of the fold $a$ and into the space $f$, between the part $b$ of the head and contiguous portions of the side plate. The solder therefore fills all the interstices between the contiguous parts of the sheet metal and makes a very solid joint.

This joint possesses the same advantage as that which is the subject of my United States Patent No. 368,348, dated August 16, 1887, so far as consists in there being no raw or cut edge for the solder to pass inside of the joint, and it possesses, owing to the outward fold $a$ and opening $d$, the additional advantage of provision for the solder to enter the space within the fold $a$, which it cannot do when the side plate is folded inward, as shown in that patent.

What I claim as my invention, and desire to secure by Letters Patent, is—

A soldered joint for the plates of a sheet-metal vessel in which both plates have their marginal portions folded, and the folded portion of one is placed within that of the other, and in which the edges of both plates are presented at the outside of the joint, substantially as herein described.

HERMAN MILLER.

Witnesses:
 FREDK. HAYNES,
 HENRY J. McBRIDE.